(12) United States Patent
Hwang et al.

(10) Patent No.: US 8,088,855 B2
(45) Date of Patent: Jan. 3, 2012

(54) POWDER COATING METHOD AND PAINT THEREOF

(75) Inventors: Gan-Lin Hwang, Tainan (TW); Ting-Yao Su, Pingtung (TW)

(73) Assignee: Industrial Technology Research Institute, Hsinchu County (TW)

( * ) Notice: Subject to any disclaimer, the term of this patent is extended or adjusted under 35 U.S.C. 154(b) by 150 days.

(21) Appl. No.: 12/404,313

(22) Filed: Mar. 15, 2009

(65) Prior Publication Data

US 2010/0136256 A1  Jun. 3, 2010

(30) Foreign Application Priority Data

Nov. 28, 2008  (TW) .............................. 97146218 A

(51) Int. Cl.
 *C08K 7/24* (2006.01)
 *C08K 3/22* (2006.01)
(52) U.S. Cl. ........ 524/405; 427/540; 427/486; 524/439; 524/428; 524/424; 524/418; 524/430

(58) Field of Classification Search .................. 524/405, 524/439, 428, 424, 418, 430; 427/540, 486
See application file for complete search history.

(56) References Cited

U.S. PATENT DOCUMENTS

| | | | |
|---|---|---|---|
| 6,872,236 B1 * | 3/2005 | Hwang | 75/347 |
| 7,156,958 B2 * | 1/2007 | Hwang | 204/164 |
| 7,217,748 B2 * | 5/2007 | Hwang et al. | 523/218 |
| 2008/0139692 A1 * | 6/2008 | Ishizu et al. | 522/173 |
| 2008/0311373 A1 * | 12/2008 | Hsu et al. | 428/293.4 |

* cited by examiner

*Primary Examiner* — Robert D. Harlan

(74) *Attorney, Agent, or Firm* — Pai Patent & Trademark Law Firm; Chao-Chang David Pai

(57) ABSTRACT

Disclosed is a powder coating method and paint thereof. First, a metal object is applied a voltage. Second, paint is rubbed to carry a static charge, wherein the static charge is opposite to the voltage applied to the metal object. The statically charged paint is then sprayed from a nozzle to the metal object to form a coating covering the metal object surface. The paint composition includes 90 to 99.9 parts by weight of a resin matrix, and 10 to 0.1 parts by weight of a carbon nanocapsule evenly dispersed in the resin matrix.

8 Claims, 2 Drawing Sheets

US 8,088,855 B2

POWDER COATING METHOD AND PAINT THEREOF

CROSS REFERENCE TO RELATED APPLICATIONS

This Application claims priority of Taiwan Patent Application No. 097146218, filed on Nov. 28, 2008, the entirety of which is incorporated by reference herein.

BACKGROUND OF THE INVENTION

1. Field of the Invention

The invention relates to carbon nanocapsules, and in particular to powder coating paint including the same and the powder coating method utilizing the paint.

2. Description of the Related Art

A powder coating method is a general dry coating method, wherein its principle depends on rubbing powder coating paint to make powders carrying static charge. The static charged powders are subsequently sprayed on to a metal object having an opposite charge, thereby forming a coating covering the metal object. To improve coating quality, the resin matrix of the paint is added a small amount of additives such as 1 to 2 parts by weight of a carbon nanotube, carbon black, metal powder, nitride (boron nitride or aluminum nitride), or ceramic powder. However, such a low amount of additives do not result in satisfactory electrical conductivity to dissipate static electricity. Furthermore, a resin matrix with the additives has poor thermal conductivity. Specifically, thermal conductivity for a metal object coated with the resin matrix with the additives, results in the coated metal object having worse thermal conductivity, static electricity dissipation capabilities, electrical magnetic shielding protection, radical protection, and anti-etching properties that compared to that of a non-coated metal object. Accordingly, a novel powder coating paint composition for improving the coating performance is called for.

SUMMARY OF THE INVENTION

The invention provides a powder coating paint, comprising 90 to 99.9 parts by weight of a resin matrix; and 0.1 to 10 parts by weight of a carbon nanocapsule evenly dispersed in the resin matrix.

The invention also provides a powder coating method, comprises: providing a metal object; applying a voltage to the metal object; rubbing the paint as described above to make the paint carry a static charge, wherein the charge is opposite to the voltage applied to the metal object; and spraying the static charged paint from a nozzle to the metal object, thereby forming a coating covering the metal object.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
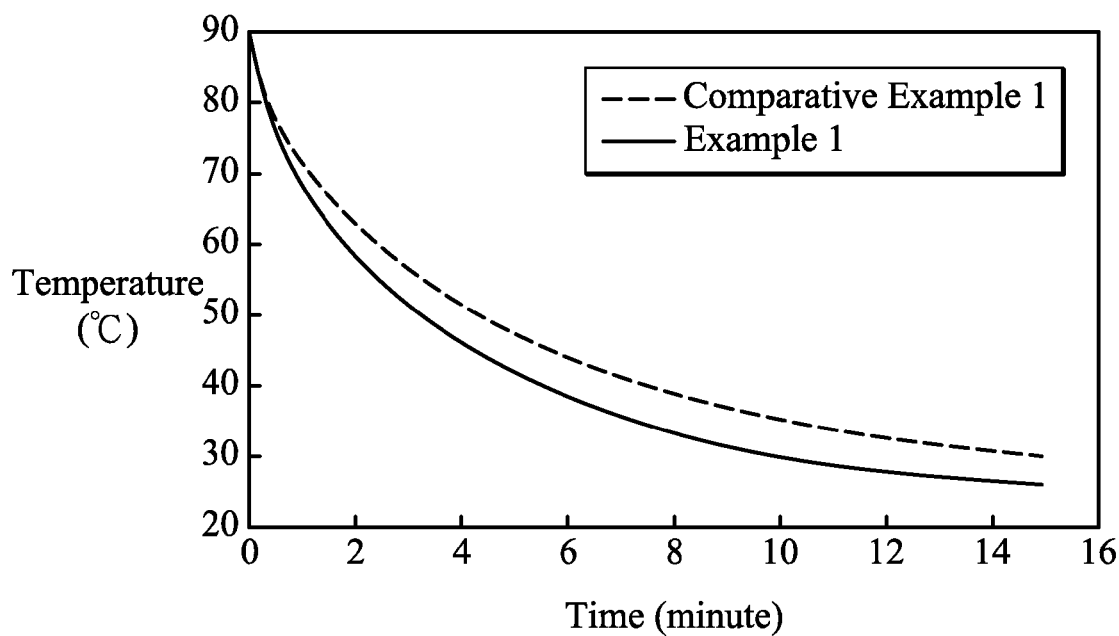
FIG. 1 shows the thermal dissipation curves of different thermal dissipation fins in Examples of the invention.

The following description is of the best-contemplated mode of carrying out the invention. This description is made for the purpose of illustrating the general principles of the invention and should not be taken in a limiting sense. The scope of the invention is best determined by reference to the appended claims.

To improve conventional powder coating paint properties, a carbon nanocapsule is adopted to be an additive of the powder coating paint. The carbon nanocapsule is a carbon polyhedron cluster composed of a multi-layered graphite ball-in-ball structure, wherein the diameter thereof is about 3 to 60 nm. The carbon nanocapsule is applied in many fields such as for medicine (medical degree active carbon), photo/thermal absorption, electrical magnetic shielding, organic light emitting materials, solar power receivers, catalysts, sensors, carbon electrode of lithium batteries, thermal conductive and specific electrical nanocomposites, or carbon nano powders for printing. Carbon nanocapsules are roughly categorized into two categories: hollow carbon nanocapsule and metal-filled carbon nanocapsule. The core of the former is empty, and the core of the latter is filled with pure metal, metal oxide, metal carbide, metal sulfide, metal nitride, metal borate, or alloy. The preparation of the two types of a carbon nanocapsules is disclosed in U.S. Pat. Nos. 7,156,958 and 6,872,236. In addition, the carbon nanocapsule shell can be pure carbon, or doped by nitrogen, phosphorous, boron, or the likes to increase its electrical conductivity.

A suitable resin matrix used by the paint of the invention includes poly(methylmethacrylate) (PMMA), polyester (PE), polyurethane (PU), polytetrafluoroethylene (PTFE), epoxy resin, or the likes. In one embodiment, the resin matrix and the carbon nanocapsule have a weight ratio of 99.9:0.1 to 90:10. It is understood that if the amount of the carbon nanocapsule is less than the above range, physical properties of the powder coating will not be efficiently improved. Meanwhile, if amount of the carbon nanocapsule is higher than the above range, coating uniformity will be reduced due to static charge effects during the powder coating process. Furthermore, the carbon nanocapsule surface can be modified by grafting and the likes, such that the modified functional groups crosslink to the resin matrix. The described modification of the carbon nanocapsule surface is disclosed in U.S. Pat. No. 7,217,748.

Although the major additive of the paint is carbon nanocapsule, it may further include other fillers such as nanotube, carbon black, metal powder, boron nitride, aluminum nitride, ceramic powder, or the other conventional additives. In one embodiment, the filler and the carbon nanocapsule have a weight ratio of 1:1 to 1:10. In one embodiment, the filler and the carbon nanocapsule are dispersed among each other to avoid degrading coating properties.

The powder coating method utilizing the described paint is similar to general methods. First, a metal object such as a substrate, fin, or case is applied a voltage. The metal object serves as thermal dissipation device such as a lamp cap, computer case, or any device producing a lot of heat while in operation. The paint is then rubbed to carry a static charge, and the static charge is opposite to the voltage applied to the metal object. Lastly, the static charged paint is sprayed on to the metal object to form a coating uniformly covering the metal object surface. The factors of the powder coating method, such as rubbing condition, nozzle type, or coating period are not limited in the invention. Those skilled in the art may choose appropriate factors according to the metal object size and demanded coating thickness. Even if similar powder coating factors are chosen, the coating utilizing the paint including carbon nanocapsule as an additive will have better properties such as film thickness uniformity, naturally thermal dissipation, static electricity dissipation, electrical and magnetic shielding, radical protection, or anti-etching properties, than that compared to paint including conventional additives.

EXAMPLES

Example 1

1 kg of a surface modified carbon nanocapsule (prepared by Taiwan Pat. No. 197772) and 50 kg of a commercially available poly(methylmethacrylate) were copolymerized, crumbled, pelletized, evenly mixed, and then sprayed on to an aluminum thermal dissipation fin to form a coating thereon by a powder coating machine. In practice, as in the example, a mixture of the surface modified carbon nanocapsule and commercially available poly(methylmethacrylate) was mechanical grounded and stirred at high speeds, and then thermal treated to copolymerize the resin and the modified carbon nanocapsule to form powder. The powder was then aggregated/solidified and then crumbled/grounded/dispersed. The process was repeated twice. Lastly, the powder was grounded to form evenly fine powders. Powder that was too large (>100 μm) was removed by a sieve, and powder that was too small (<0.5 μm) was removed by a blow, such that the coating had good appearance. The characteristics of the coating included a black appearance, thermal conductivity of about 0.8 W/mK, electrical resistance of about $5.5*10^6$ $\Omega/cm^2$, radiation irradiance greater than 98%, and a pencil surface hardness greater than 6H. The coated fin was charged in an oven, heated to 90° C., and then set at room temperature to measure its thermal dissipation curve (temperature versus time) as shown in FIG. 1.

Comparative Example 1

The aluminum thermal dissipation fin of Example 1, not covered by any coating, was directly charged in an oven, heated to 90° C., and then set at room temperature to measure its thermal dissipation curve (temperature versus time) as shown in FIG. 1. As shown in FIG. 1, the temperature of the fin with coating thereon (including carbon nanocapsule) was shown to decrease faster than that of the fin without coating thereon. Accordingly, the coating showed radiation cooling effect.

Example 2

Figure 2:
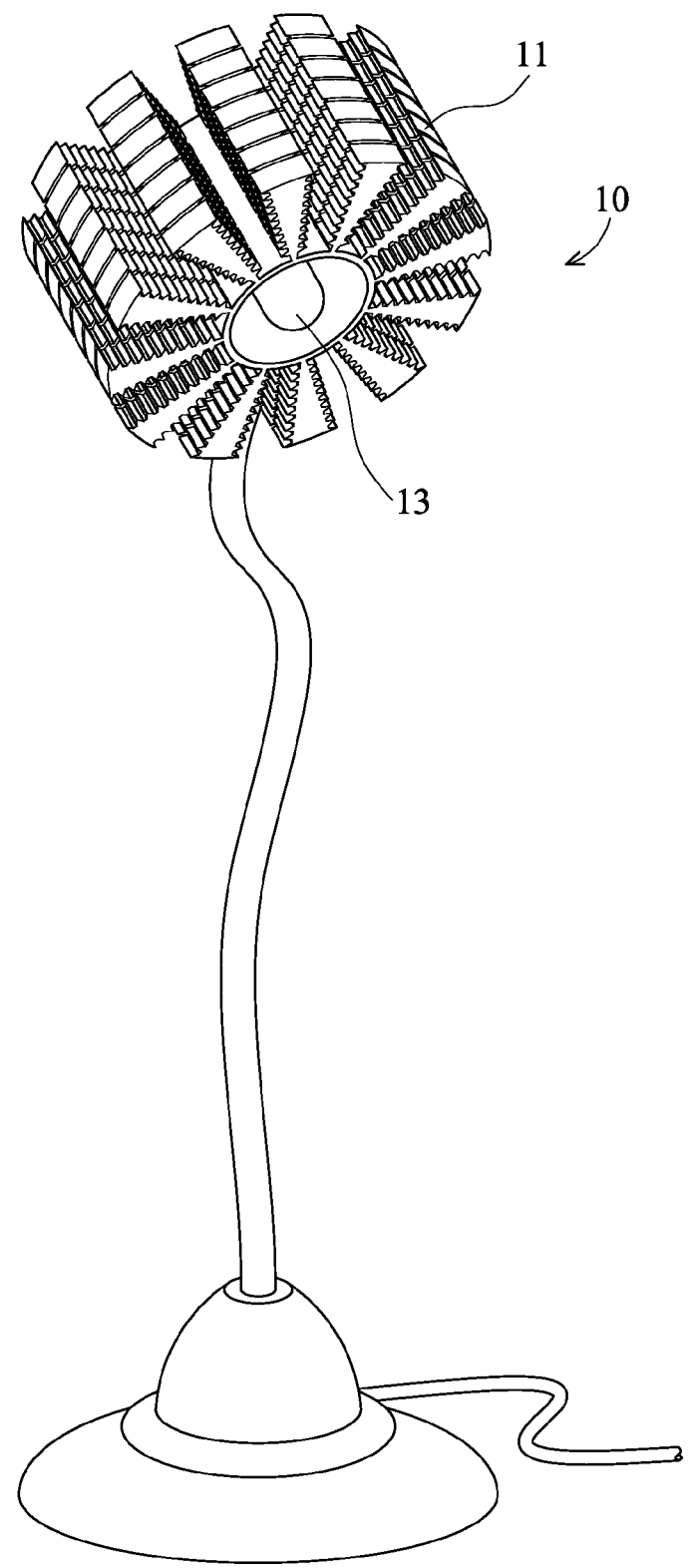
FIG. 2 is a schematic view showing a table lamp in one Example of the invention.

The paint of Example 1 was sprayed on a lamp cap 11 of an LED table lamp 10 to form a coating covering the lamp cap 11. As shown in FIG. 2, the lamp cap 11 was designed as a thermal dissipation fin. The coating had a thickness of about 60 μm to 100 μm. After the 5 W LED lamp 13 was lighted for about 20 minutes, the lamp cap 11 had a temperature of 50° C. and luminance of 2950 Lux ($lm/m^3$).

Comparative Example 2

Similar to Example 2, the difference was that the lamp cap 11 of the LED table lamp 10 had no coating thereon. After the 5 W LED lamp 13 was lighted for about 20 minutes, the lamp cap 11 had a temperature of 65° C. and luminance of 1780 Lux ($lm/m^3$). Furthermore, the lamp 13 began flickering due to over-heatedness. Compared to Example 2, the lamp cap with no coating thereon had a higher temperature and correspondingly shortened LED lamp life. In addition, the overheated lamp cap temperature decreased luminous performance of the LED lamp 13.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A powder coating paint, comprising:
   90 to 99.9 parts by weight of a resin matrix; and
   0.1 to 10 parts by weight of a carbon nanocapsule dispersed in the resin matrix,
   wherein the powder coating paint is in a powder form.

2. The paint as claimed in claim 1, wherein the resin matrix comprises polyester, poly(methylmethacrylate), polyurethane, polytetrafluoroethylene, or epoxy resin.

3. The paint as claimed in claim 1, wherein the carbon nanocapsule comprises a hollow carbon nanocapsule or metal-filled carbon nanocapsule.

4. The paint as claimed in claim 3, wherein the carbon nanocapsule comprises metal-filled carbon nanocapsule and the metal-filled carbon nanocapsule is filled with pure metal, metal oxide, metal carbide, metal sulfide, metal nitride, metal borate, or alloy.

5. The paint as claimed in claim 1, wherein the carbon nanocapsule is doped by a dopant comprising nitrogen, phosphorous, or boron.

6. The paint as claimed in claim 1, wherein the carbon nanocapsule has modified functional groups to crosslink the resin matrix.

7. The paint as claimed in claim 1 further comprising a filler, and the filler and the carbon nanocapsule have a weight ratio of 1:1 to 1:10.

8. The paint as claimed in claim 7, wherein the filler comprises carbon nanotube, carbon black, metal powder, boron nitride, aluminum nitride, or ceramic powder.

* * * * *